(12) United States Patent
Chang et al.

(10) Patent No.: US 8,629,911 B2
(45) Date of Patent: Jan. 14, 2014

(54) AUTOMATIC PHOTOGRAPHING SYSTEM AND METHOD THEREOF

(75) Inventors: Tzu-Lin Chang, New Taipei (TW); Chen-Hao Kao, Hsinchu County (TW); Rong-Hong Jan, Hsinchu (TW); Chia-Tai Tsai, Taipei (TW)

(73) Assignee: Institute for Information Industry, Taipei (TW)

( * ) Notice: Subject to any disclaimer, the term of this patent is extended or adjusted under 35 U.S.C. 154(b) by 202 days.

(21) Appl. No.: 13/188,957

(22) Filed: Jul. 22, 2011

(65) Prior Publication Data

US 2012/0281105 A1 Nov. 8, 2012

(30) Foreign Application Priority Data

May 4, 2011 (TW) .............................. 100115569 A

(51) Int. Cl.
 *H04N 5/232* (2006.01)
(52) U.S. Cl.
 USPC ..................................... 348/211.6; 348/211.2

(58) Field of Classification Search
 USPC ........... 348/211.99–211.4, 143, 211.5, 211.6; 455/556.1
 See application file for complete search history.

(56) References Cited

U.S. PATENT DOCUMENTS

| 7,936,370 B2 * | 5/2011 | Renkis ......................... 348/143 |
| 2008/0303909 A1 * | 12/2008 | Watanabe et al. .......... 348/211.2 |

FOREIGN PATENT DOCUMENTS

TW 200625974 A 7/2006

\* cited by examiner

*Primary Examiner* — Tuan Ho
(74) *Attorney, Agent, or Firm* — Birch, Stewart, Kolasch & Birch, LLP

(57) ABSTRACT

An automatic photographing method is provided. The method includes the steps of: receiving a dialing message from a telecommunications network; recognizing a phone number from the dialing message, and controlling a camera module to take at least one photo according to the dialing message; and performing image processing to the photo to generate photo data corresponding to the phone number.

16 Claims, 4 Drawing Sheets

AUTOMATIC PHOTOGRAPHING SYSTEM AND METHOD THEREOF

CROSS REFERENCE TO RELATED APPLICATIONS

This Application claims priority of Taiwan Patent Application No. 100115569, filed on May 4, 2011, the entirety of which is incorporated by reference herein.

BACKGROUND OF THE INVENTION

1. Field of the Invention

The present invention relates to photographing systems, and in particular relates to systems and methods for automatic photographing according to a dialup message from a telecommunications network.

2. Description of the Related Art

When tourists visit a scenic spot, a conventional automatic photographing system takes photos by using camera devices provided by a vendor. When a user passes through a view of a camera device, the camera device will be activated automatically and take photos. The user can view the photos on a screen set up by the vendor, select favorite photos and pay for the photos at a counter according to the number of photos purchased. However, there are several drawbacks of the conventional automatic photographing system. First, a user can not determine the timing for when the photos are taken. For example, a user uses a gaming facility in an amusement park, and the camera device set up by the vendor takes photos for all of the users when the gaming facility starts. Thus, a user can not determine the timing for when he or she may want to take photos of him or herself. Second, all the photos of the same user taken at various scenic spots can not be integrated together. The user has to select and pay for the photos taken by the conventional automatic photographing system on the spot. Moreover, there are more than one camera devices set up by the vendor, and the conventional automatic photographing system can not recognize and integrate the photos for each user, such that the user has to obtain the photos at difference places. Third, the photos captured by the conventional automatic photographing system can not be stored for a long time. Because the photos captured by the conventional automatic photographing system are only stored for a short period of time or not stored at all, the user has to select and pay for the photos immediately and can not get copies of the photos.

BRIEF SUMMARY OF THE INVENTION

A detailed description is given in the following embodiments with reference to the accompanying drawings.

An automatic photographing system is provided in the invention. The system comprises: a camera module; a communications module, for receiving a dialing message from a telecommunications network; a control module, for recognizing a phone number from the dialing message, and controlling the camera module to take at least one photo; and an image processing module, for performing image processing to the photo to generate photo data corresponding to the phone number.

An automatic photographing method is further provided in the invention. The method comprises: receiving a dialing message from a telecommunications network; recognizing a phone number from the dialing message, and controlling a camera module to take at least one photo according to the dialing message; and performing image processing to the photo to generate photo data corresponding to the phone number

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
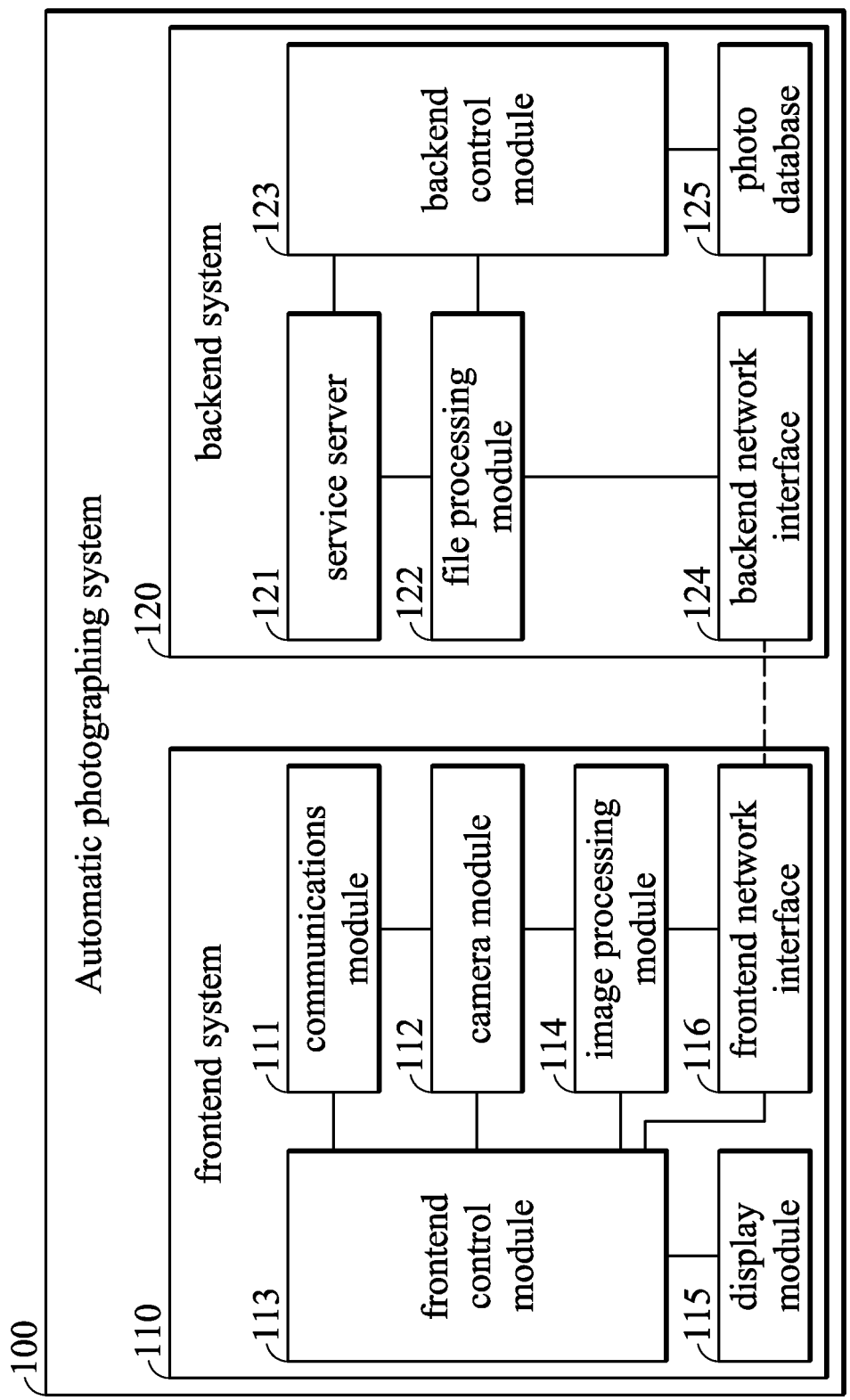
FIG. 1 illustrates a block diagram of the automatic photographing system according to an embodiment of the invention.

FIG. 1 illustrates a block diagram of the automatic photographing system according to an embodiment of the invention. The automatic photographing system 100 comprises a frontend system 110, and a backend system 120. The frontend system 110 is the photographing system set up by the vendor, such as the photographing system set up at each scenic spot in an amusement park for receiving a dialing message from a user to take photos of the user, and the photos are further processed in the frontend system 110 and transmitted to the backend system 120. In an embodiment, the frontend system 110 further comprises a communications module 111, a camera module 112, a frontend control module 113, an image processing module 114, a display module 115 and a frontend network interface 116. The communications module 111 further includes a SIM card, which has an individual phone number for receiving a dialing message from a user and recognizing the phone number of the user. The communications module 111 receives the dialing message from the user through a telecommunications network to trigger the camera module 112 by the frontend control module 113 to take photos of the user(s) in the corresponding photo zone. The mobile device of the user can be the media for controlling the frontend system 110 to enhance the handling of the automatic photographing system 100, and thus it is more convenient for the user to determine the timing for taking photos by himself/ herself, wherein the identification of the photos can be based on the phone number of the user. In another embodiment, in addition to the phone number, the user may also use a smart phone to send a message to the frontend system 110 by using an email or a short message service (SMS) message to trigger the camera module 112 to take photos. However, both the communications device (e.g. mobile phone) of the user and the frontend system 110 should be located at places with good reception, but the invention is not limited thereto.

The camera module 112 can be a camera or a video camera. In an embodiment, the vendor can set up multiple frontend systems 110 in different locations in the same scenic spot, wherein each camera has its own preset focus length and aperture, so that the photos of the user can be taken in different angles. Multiple frontend systems 110 in the same scenic spot can use a common phone number or use an individual phone number, and the user can operate the frontend systems 110 set up in the scenic spot according to the instructions thereof. After taking photos, the user can select photos with his/her favorite angles, and the frontend system 110 can transmit the selected photos to the backend system 120 through a network (e.g. a wired network, a telecommunications network or a wireless network).

Figure 4:
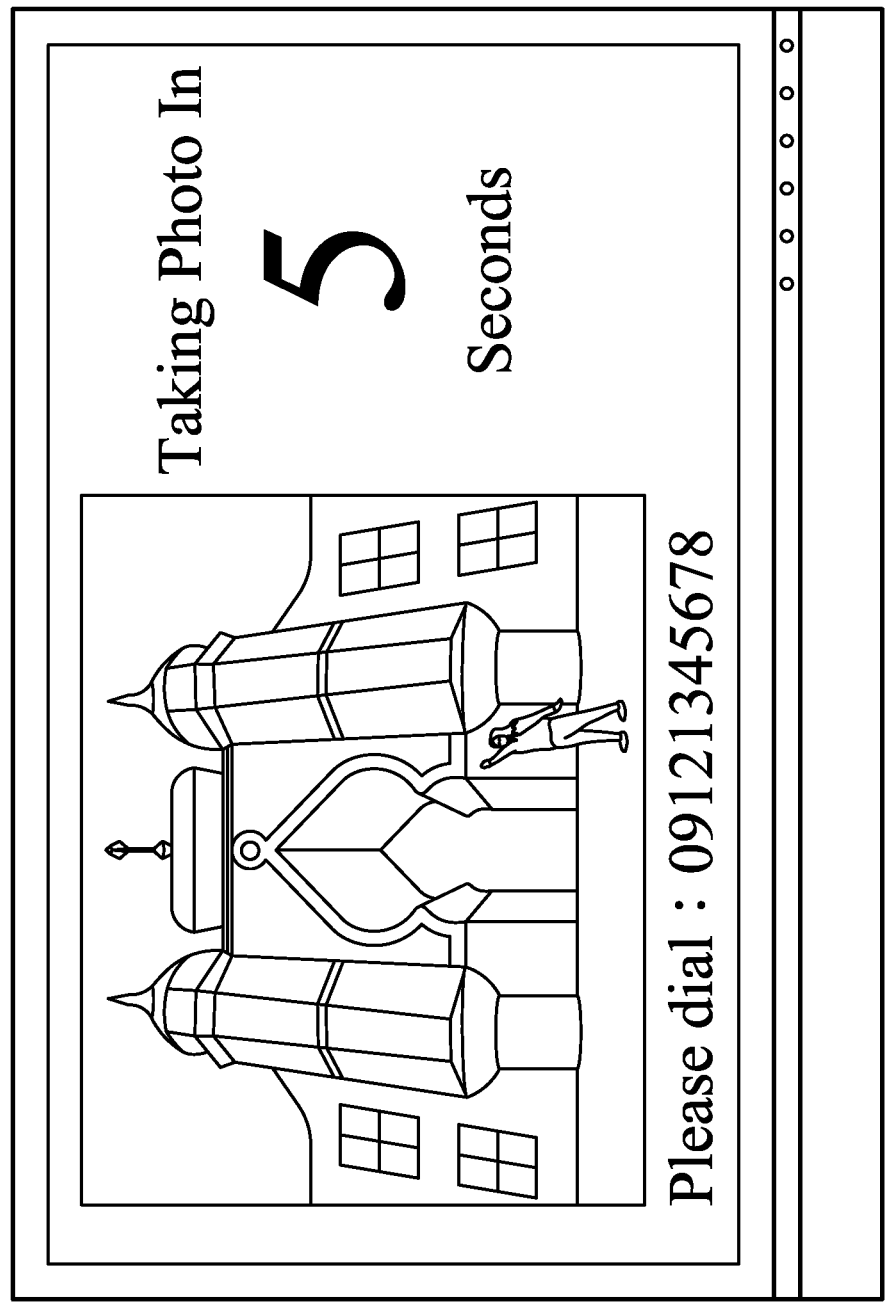
FIG. 4 illustrates a diagram for displaying an estimated shooting time and the current view of the display module of the frontend system according to an embodiment of the invention.

The frontend control module 113 uses a processor (not shown) to execute a control program to control each module in the frontend system 110. For example, when the communications module 111 receives a dialing message of the phone number of the user, the frontend control module 113 uses a phone message processing program to capture the phone number of the user, displays a message of an estimated shooting time (e.g. after 5 seconds) on the display module 115 (as shown in FIG. 4), and triggers the camera module 112 to take photos. After taking photos, the camera module 112 will transmit the captured photos to the image processing module 114, and display the captured photos on the display module 115. The image processing module 114 performs image processing to the captured photos and marks the photos with information of a shooting time, a shooting date and the phone number of the user. For example, the phone number can be regarded as the primary key, and the processed photo data (e.g. image files) are transmitted to the backend system 120 through the frontend control module 113 and the frontend network interface 116.

The image processing module 114 performs image processing to the photos captured by the camera module 112. In another embodiment, when the camera module 112 is taking photos, continuous capturing can be used, such as capturing at least two photos continuously, and the image processing module 114 can perform corresponding image processing to the captured continuous photos, such as focus/defocus, or motion estimation, to generate output photos with better image effects. When the user dials for the frontend system 110, the user can use the buttons on the mobile phone to control the interface of the frontend system 110 according to the instructions on the frontend system 110 to adjust the settings of the camera module 112, such as the focus length or the aperture. In this embodiment, for example, the number button 1 can be pressed to perform a zoom-in function, the number button 2 can be pressed to perform a zoom-out function. The frontend control module 113 can further display the current view of the camera module 112, the control method and notification messages of the frontend system 110 on the display module 115. For example, the display module 115 can be an LCD, CRT or LED display, but the invention is not limited thereto. In another embodiment, the display module 115 further comprises a control interface (such as a touch-control device). The user can use the control interface to adjust the settings of the focus length, the aperture or the flash light, or the brightness or contrast of the captured photos, but the invention is not limited thereto.

In yet another embodiment, the frontend system 110 further comprises a photo data storage unit (not shown). When the communications condition between the frontend system 110 and the backend system 120 is poor, the frontend system 110 can not transmit the captured photos to the backend system 120 immediately, and thus the frontend system 110 has to store the captured photos in the photo data storage unit and set a batching time period (e.g. 12 hours) to transmit the captured photos to the backend system 120, but the invention is not limited thereto.

In an embodiment, the backend system 120 comprises a service server 121, a file processing module 122, a backend control module 123, a backend network interface 124, and a photo database 125. The service server 121 provides a website with a browsing interface (not shown), and the user can use a computer or a portable device to log onto the identification security program to connect to the service server 121 through the internet, and select the favorite photos through the browsing interface. The file processing module performs post-processing to the received photo data, such as classifying the photo data by filenames, so that the user can browse and query the photo data according to the name of the scenic spot, shooting time and shooting date. In another embodiment, the resolution of the photos captured by the frontend system 110 is quite large (e.g. 8 millions to 10 millions pixels, but not limited thereto), and the file processing module 122 can further scale down (or transform) the photo data into thumbnail photos or photo files with a lower resolution, and add a watermark onto the thumbnail photos before/after the scaling processing, and store both the original photo data and thumbnail photos into the photo database 125. When the user logs onto the service server 121, the service server 121 can retrieve the thumbnail photos of the user in each scenic spot from the photo database 125 by using the backend control module 123, and perform indexing and sorting of the retrieved thumbnail photos according to the phone number of the user, shooting date, shooting time, of the name of the scenic spot. Thus, the user can integrate and download the complete original photos and make copies of the photos when needed, but the invention is not limited thereto.

In another embodiment, the backend control module 123 uses a processor (not shown) to execute a control program, and receives the photo data from the frontend server 110 through the backend network interface 124 (e.g. a wired network, a telecommunications network or a wireless network). When the backend control module 123 receives the photo data of a new user for the first time (or the first time in a day), the backend control module 123 can send an SMS message to the new user according to the phone number of the new user, wherein the content of the SMS message includes the phone number as the account, the corresponding password, and the website link of the service server 121, and the user can use the content to log onto the service server 121. In another embodiment, the user can connect to the service server 121 to register to obtain an account and a corresponding password, and logon to the phone numbers in use. When the user uses a previously registered phone number to dial up to the frontend server 110 to take photos, the photo data generated by the frontend system 110 can be integrated into the same user account, but the invention is not limited thereto.

The backend network interface 124 is configured to receive the photo data from the frontend network interface 115, wherein the backend network interface 124 can be an interface of a wired network or a wireless network, but the invention is not limited thereto. The photo database 125 is configured to store all of the photo data captured by the frontend system 110, so that the user can log onto the service server 121 through the internet to perform indexing, querying and downloading individual photo data.

Figure 2:
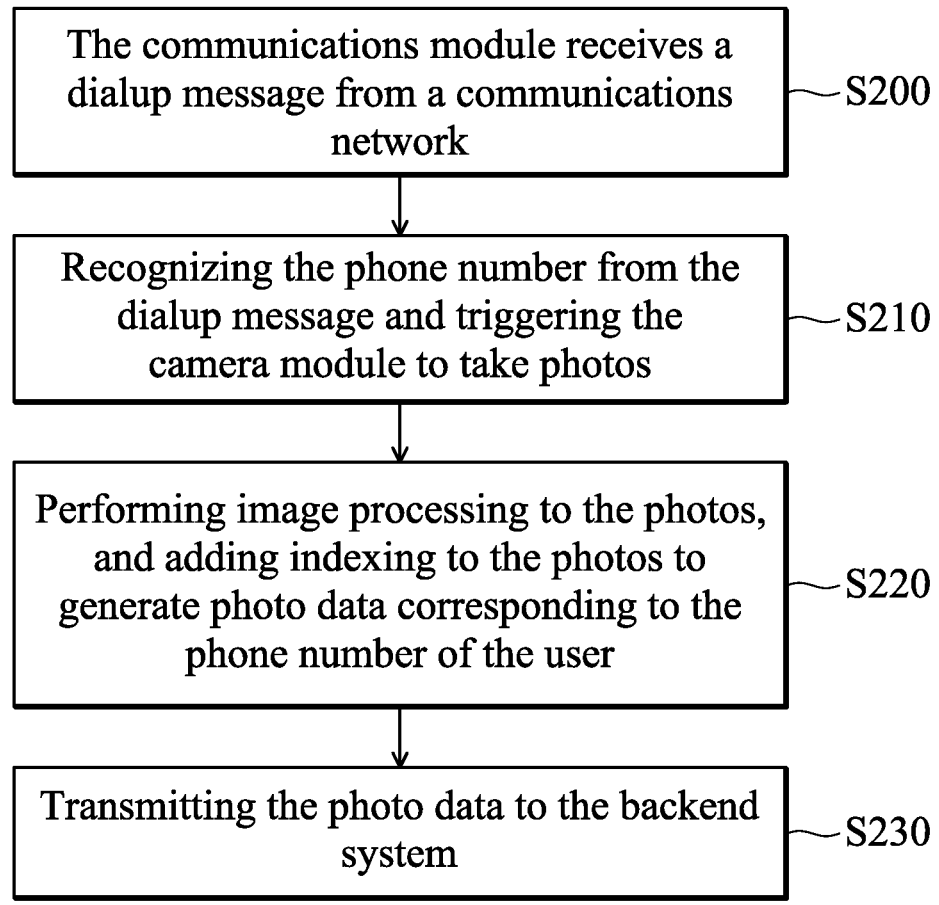
FIG. 2 illustrates a flow chart of the automatic photographing method in the frontend system according to an embodiment of the invention.

FIG. 2 illustrates a flow chart of the automatic photographing method of the frontend system 110 according to an embodiment of the invention. In step S200, the user dials up his/her mobile phone, and the communications module 111 of the frontend system 110 receives the dialing message of the user through a telecommunications network. In step S210, the frontend control module 113 recognizes the phone number of the user, and triggers the camera module 112 to take photos. In step S220, the image processing module 114 performs image processing to the captured photos, and adds information of shooting time, shooting location and the phone number to generate photo data corresponding to the phone number of the user. In step S230, the frontend control module 113 transmits the photo data to the backend system 120 through the frontend network interface 116 (e.g. a wired network, a telecommunications network or a wireless network).

Figure 3:
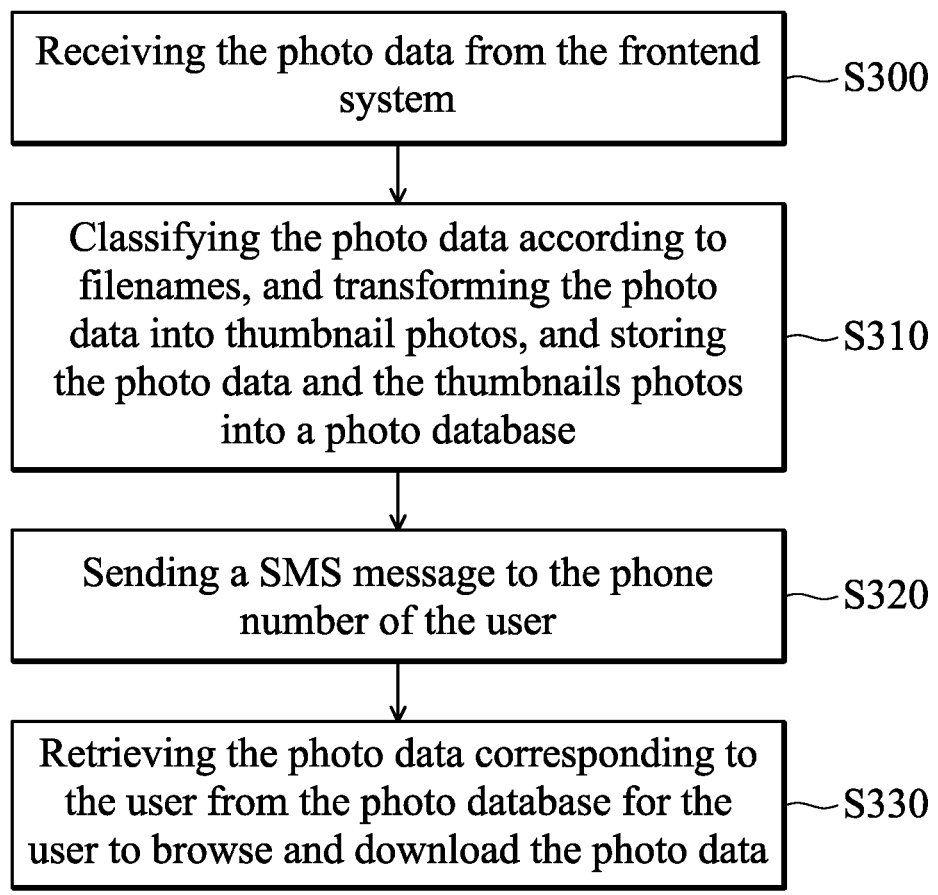
FIG. 3 illustrates a flow chart of the automatic photographing method in the backend system according to an embodiment of the invention.

FIG. 3 illustrates a flow chart of the automatic photographing method of the backend system 120 according to an embodiment of the invention. In step S300, the file processing module 122 receives the photo data from the frontend system 110 through the backend network interface 124 (e.g. a wired network, a telecommunications network or a wireless network). In step S310, the file processing module 122 classifies the photo data according to filenames, transforms the photo data into thumbnail photos, and stores the photo data and the thumbnail photos into the photo database 125. In step S320, after the backend control module 123 receives the photo data, the backend control module 123 sends an SMS message to the phone number of the user through a telecommunications network. In step S330, the service server 121 retrieves the photo data corresponding to the user from the photo database 125, so that the user can browse the website provided by the service server 121 to download the photo data.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A automatic photographing system, comprising
a camera module;
a communications module, for receiving a dialing message from a telecommunications network;
a control module, for recognizing a phone number from the dialing message, and controlling the camera module to take at least one photo; and
an image processing module, for performing image processing to the photo to generate photo data corresponding to the phone number,
wherein the control module further transmits the photo data to a backend system through a wired network, a telecommunications network or a wireless network,
wherein the backend system further comprises:
a file processing module, for receiving the photo data from a backend network interface, and transforming the photo data into a thumbnail photo, wherein the photo data and the thumbnail photo are stored into a photo database; and
a service server, for providing a website, wherein when a user corresponding to the photo data logs onto the website, the service server retrieves the photo data and the thumbnail photo corresponding to the user for the user to browse and download the photo data.

2. The automatic photographing system as claimed in claim 1, wherein the communications module further comprises a SIM card.

3. The automatic photographing system as claimed in claim 1, wherein the control module further displays the photo captured by the camera module on a display module.

4. The automatic photographing system as claimed in claim 1, wherein the image processing module further adds information of a shooting time and a shooting location of the photo data.

5. The automatic photographing system as claimed in claim 1, wherein the control module further controls a view of a lens of the camera module to zoom in or zoom out according to the dialing message.

6. The automatic photographing system as claimed in claim 1, wherein the file processing module further adds a watermark to the photo data before transforming the photo data into the thumbnail photo.

7. The automatic photographing system as claimed in claim 1, wherein the service server further uses an identification security program for the user to log onto the website.

8. The automatic photographing system as claimed in claim 1, wherein when the file processing module receives the photo data, the file processing module sends an SMS message to the phone number.

9. An automatic photographing method, comprising:
receiving a dialing message from a telecommunications network;
recognizing a phone number from the dialing message, and controlling a camera module to take at least one photo according to the dialing message;
performing image processing to the photo to generate photo data corresponding to the phone number; and
transmitting the photo data to a backend system through a wired network, a telecommunications network or a wireless network,
wherein the backend system further executes the steps:
receiving the photo data from a backend network interface, and transforming the photo data into a thumbnail photo, wherein the photo data and the thumbnail photo are stored into a photo database; and
providing a website, wherein when a user corresponding to the photo data logs onto the website, the photo data and the thumbnail photo can be retrieved from the photo database, and the user can browse and download the photo data.

10. The automatic photographing method as claimed in claim 9, wherein the dialing message is sent by a communications module with a SIM card.

11. The automatic photographing method as claimed in claim 9, further comprising:
displaying the photo on a display module.

12. The automatic photographing method as claimed in claim 9, wherein the steps of performing the image processing to generate the photo data further comprises:
adding information of a shooting time and a shooting location to the photo data.

13. The automatic photographing method as claimed in claim 9, further comprising:
controlling a view of a lens of the camera module to zoom in or zoom out according to the dialing message.

14. The automatic photographing method as claimed in claim 9, wherein the backend system further adds a watermark onto the photo data before transforming the photo data into the thumbnail photo.

15. The automatic photographing method as claimed in claim 9, further comprising:
using an identification security program for the user to log onto the website.

16. The automatic photographing method as claimed in claim 9, wherein when the backend system receives the photo data, the backend system transmits an SMS message to the phone number.

* * * * *